(12) United States Patent
Kogure

(10) Patent No.: US 9,682,666 B2
(45) Date of Patent: Jun. 20, 2017

(54) EXTERIOR MEMBER AND WIRE HARNESS

(71) Applicant: Yazaki Corporation, Minato-ku, Tokyo (JP)

(72) Inventor: Naoto Kogure, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/162,696

(22) Filed: May 24, 2016

(65) Prior Publication Data

US 2016/0264075 A1 Sep. 15, 2016

Related U.S. Application Data

(63) Continuation of application No. PCT/JP2014/080826, filed on Nov. 20, 2014.

(30) Foreign Application Priority Data

Nov. 27, 2013 (JP) ................................. 2013-245301

(51) Int. Cl.
*H01B 7/00* (2006.01)
*B60R 16/02* (2006.01)
(Continued)

(52) U.S. Cl.
CPC ....... *B60R 16/0215* (2013.01); *H02G 3/0462* (2013.01); *H02G 11/00* (2013.01); *H02G 3/0468* (2013.01); *H02G 3/0616* (2013.01)

(58) Field of Classification Search
CPC .......... H05K 9/0018; H02B 1/40; H01H 9/02; B60R 16/0207; B60R 16/0215;
(Continued)

(56) References Cited

U.S. PATENT DOCUMENTS 4,360,962 A * 11/1982 Suzuki ................. H01B 7/0045
29/56.6
5,389,002 A * 2/1995 Matsuda ................ H02G 11/00
439/15
(Continued)

FOREIGN PATENT DOCUMENTS

JP H08-331728 A 12/1996
JP 2002-354629 A 12/2002
(Continued)

OTHER PUBLICATIONS

Feb. 24, 2015—International Search Report—Intl App PCT/JP2014/080826.

*Primary Examiner* — Pete Lee
(74) *Attorney, Agent, or Firm* — Banner & Witcoff, Ltd.

(57) ABSTRACT

A hollow-cylinder-shaped exterior member (20) to house an electric wire bundle (10) that is a bundle of plural electric wires has a bending portion that is bendable in a state that the electric wire bundle (10) is housed in the exterior member. The bending portion has an elliptical sectional shape having two parallel, confronting sides (L1, L2) and two arcs (A1, A2) that link ends of the two sides. The interval Ds between the inside edges of the two sides (L1, L2) and the interval Dl between the deepest points of the inside edges of the two arcs (A1, A2) satisfy equations representing prescribed relationships.

3 Claims, 3 Drawing Sheets

(51) Int. Cl.
*H02G 11/00* (2006.01)
*H02G 3/04* (2006.01)
*H02G 3/06* (2006.01)

(58) Field of Classification Search
CPC ...... H01B 7/0045; H01R 11/11; H01R 4/023; H01R 4/22; H02G 15/043; H02G 3/00; H02G 3/0431; H02G 3/08; H02G 3/10; H02G 3/02; H02G 3/04; H02G 11/00; H02G 3/0468; H02G 3/0616; H02G 3/0462
See application file for complete search history.

(56) References Cited

U.S. PATENT DOCUMENTS

2005/0280288 A1* 12/2005 Suzuki ................ B60R 16/0215
296/208
2014/0299370 A1 10/2014 Ikeda

FOREIGN PATENT DOCUMENTS

| JP | 2013-150540 A | 8/2013 |
| JP | 2013-162716 A | 8/2013 |

* cited by examiner

EXTERIOR MEMBER AND WIRE HARNESS

CROSS REFERENCE TO RELATED APPLICATION

This application is a continuation of PCT application No. PCT/JP2014/080826, which was filed on Nov. 20, 2014 based on Japanese Patent Application (No. 2013-245301) filed on Nov. 27, 2013, the contents of which are incorporated herein by reference. Also, all the references cited herein are incorporated as a whole.

BACKGROUND OF THE INVENTION

1. Technical Field

The present invention relates to an exterior member as a component of a wire harness and, more particularly, to a designing method for designing a sectional shape of an exterior member.

2. Description of the Related Art

There are conventional wire harnesses that are routed in vehicles and in which an exterior member is provided where the wire harness is bent. Example exterior members are a corrugated tube and a grommet. Among wire harnesses of this kind which are equipped with an exterior member are ones that are routed in the vicinities of the doorways of slide doors of vehicles (PTL 1 and 2).

PTL 1 is JP-A-2013-150540 and PTL 2 is JP-A-2013-162716.

SUMMARY OF INVENTION

FIGS. 4(A)-4(C) are perspective views of a wire harness that is routed in the vicinity of the doorway of a slide door, and show a state that the slide door is fully opened, a state that the slide door is opened halfway, and a state that the slide door is fully closed, respectively. As shown in FIGS. 4(A)-4(C), an exterior member 7 is routed in such a manner as to be interposed between a vehicle body 1 and a slide door in the horizontal direction and to be located slightly above a step 3 of the vehicle body 1 in the vertical direction. When the slide door 5 is closed fully as shown in FIG. 4(C), the exterior member 7 thus routed in the vicinity of the doorway 2 may be seen by a driver or passenger existing inside the vehicle.

From the viewpoint of enhancing the decorativeness of the inside of the vehicle, the exterior member 7 being seen by a driver or passenger as mentioned above is not preferable. Therefore, to make it less visible, the conventional exterior member 7 is designed so small as to be hidden behind a trim of the step 3 or the slide door 5 when a driver or passenger existing inside the vehicle turns his or her eyes on a region where the exterior member 7 exists. Alternatively, the shape of the conventional exterior member 7 is designed with priority given to its appearance so as not to lower the decorativeness of the inside of the vehicle even if it is seen.

However, with the above-described design concept of the exterior member 7, the internal space of the exterior member 7 that houses a bundle of electric wires tends to be small. In the exterior member 7 having a small internal space, it is difficult to house a bundle of electric wires inside, rendering the load of housing work heavy. Furthermore, in the exterior member 7 having a small internal space, the bundle of electric wires occupies a large part of its internal space, which makes it necessary to apply a stronger force to bend the exterior member 7 and may lower the bending durability (i.e., an allowable number of times of bending within which necessary wire harness performance is maintained).

As described above, in exterior members routed in the vicinities of the doorways of slide doors, it is desired that their internal spaces are as wide as possible while they are small in external shape so as to be less visible to a driver or a passenger.

The present invention has been made in view of the above circumstances, and an object of the invention is therefore to provide an exterior member and a wire harness having the exterior member that can satisfy external shape miniaturization and securing of a necessary internal space which are in a tradeoff relationship.

To attain the above object, the exterior member according to the invention is characterized by the following item (1):

(1) A hollow-cylinder-shaped exterior member to house an electric wire bundle that is a bundle of plural electric wires, wherein:
the exterior member has a bending portion that is bendable in a state that the electric wire bundle is housed therein; and
the bending portion has an elliptical sectional shape having two parallel, confronting sides and two arcs that link ends of the two sides, and the interval Ds between inside edges of the two sides and the interval Dl between deepest points of inside edges of the two arcs satisfy relationships:

$$Ds = \phi w + C1 + C2$$

where $\phi w$ is a diameter of the electric wire bundle housed in the bending portion and C1 and C2 are clearances between the electric wire bundle and the two respective sides, and $$Dl = (Sw/Ar - \pi Ds^2/4)/Ds + Ds$$

where Sw is a cross-sectional area of the electric wire bundle housed in the bending portion and Ar is a ratio of the cross-sectional area Sw of the electric wire bundle to a cross-sectional area that is defined by inner surfaces of the bending portion, the ratio being determined according to bending durability that is required for the bending portion.

The exterior member having the configuration of item (1) whose sectional shape is defined by the shorter-axis length Ds and the longer-axis length Dl is such that its external shape is reduced and a necessary internal space is secured.

To attain the above object, the wire harness according to the invention is characterized by the following items (2) and (3):

(2) A wire harness having the exterior member according to item (1), wherein:
the wire harness is routed in a vehicle in such a manner that an arrangement direction of the two arcs is substantially perpendicular to a direction in which the bending portion is bent.

(3) The wire harness according to item (2), wherein one end portion and the other end portion of the wire harness are secured to a vehicle body and a slide door, respectively.

According to the wire harness having the configuration of item (2), compressive stress or tensile stress acts on the two sides more easily and hence the wire harness is bent more easily with the two sides serving as axes.

According to the wire harness having the configuration of item (3), since the external shape is reduced in size, the exterior member that is routed in the vicinity of the doorway of the slide door is made less visible to a driver or passenger.

The invention can provide an exterior member and a wire harness having the exterior member that can satisfy external shape miniaturization and securing of a necessary internal space which are in a tradeoff relationship.

The invention has been described above concisely. The details of the invention will become more apparent when the modes for carrying out the invention (hereinafter referred to as an embodiment) described below is read through with reference to the accompanying drawings.

DETAILED DESCRIPTION OF THE EXEMPLARY EMBODIMENTS

Figure 1A:
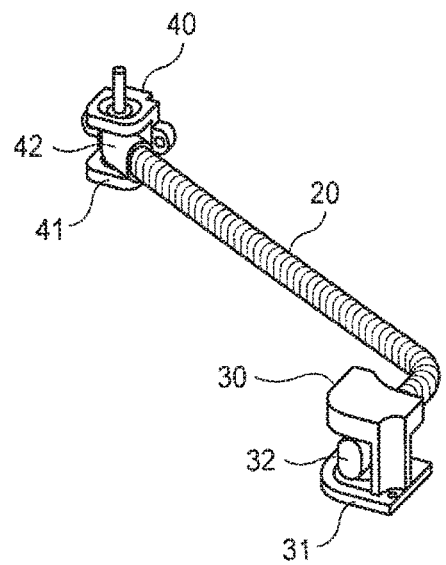
FIGS. 1(A)-1(C) are perspective views showing states of routing of a wire harness according to an embodiment of the invention in the vicinity of the doorway of a slide door, that is, a state that the slide door is fully opened, a state that the slide door is opened halfway, and a state that the slide door is fully closed, respectively.
Figure 1B:
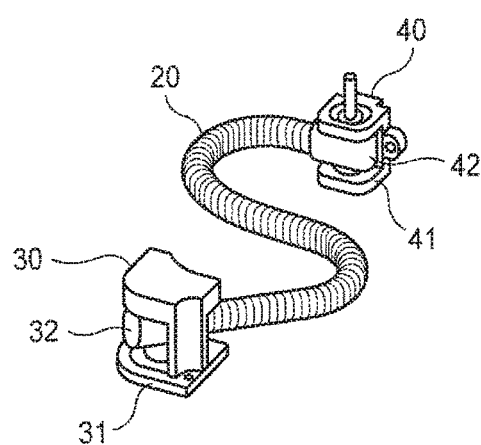
Figure 1C:
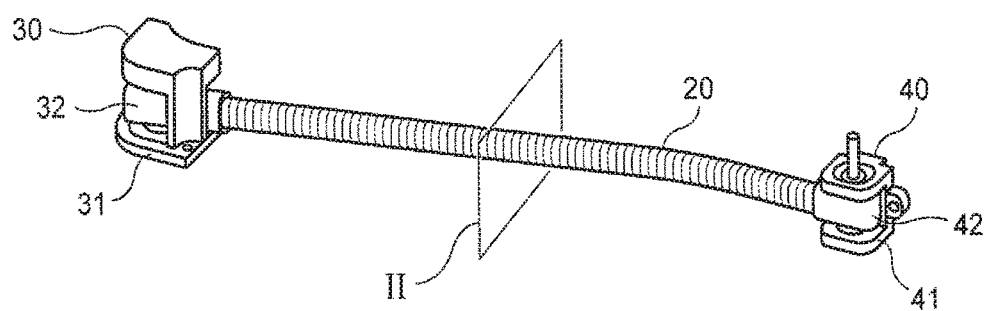
Figure 2:
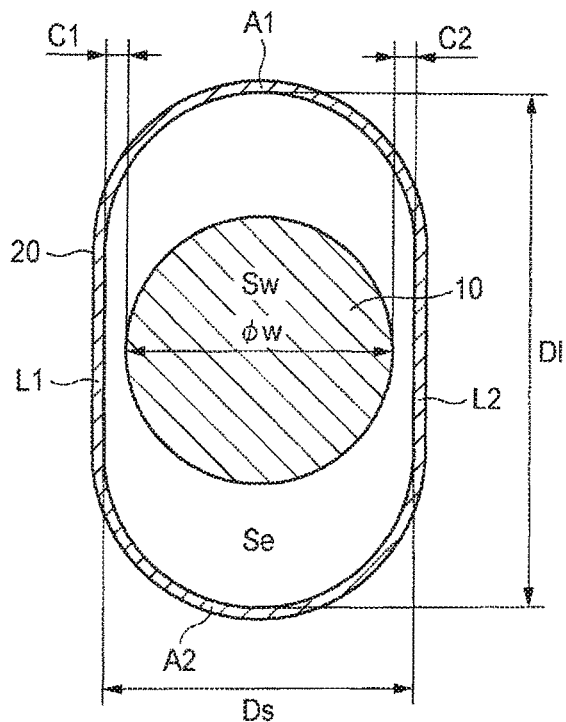
FIG. 2 is a sectional view, taken by plane II in FIG. 1(C), of the wire harness according to the embodiment of the invention.

A specific embodiment of the present invention will be hereinafter described with reference to the drawings. FIGS. 1(A)-1(C) are perspective views showing states of routing of a wire harness according to the embodiment of the invention in the vicinity of the doorway of a slide door, that is, a state that the slide door is fully opened, a state that the slide door is opened halfway, and a state that the slide door is fully closed, respectively. FIG. 2 is a sectional view, taken by plane II in FIG. 1(C), of the wire harness according to the embodiment of the invention.

As shown in FIGS. 1(A)-2, the wire harness according to the embodiment of the invention is configured so as to include an electric wire bundle 10 and an exterior member 20. The wire harness according to the embodiment of the invention is configured so as to also include a vehicle-body-side power supply tool 30 and a slide-door-side power supply tool 40.

The electric wire bundle 10, which is a bundle of plural electric wires, is housed in the exterior member 20. The sectional shape of the electric wire bundle 10 which is a collection of electric wires varies depending or the positions on and thicknesses of the respective electric wires, the manner of twisting of the electric wires, and other factors. However, to facilitate understanding of the invention, in this specification descriptions will be made with an assumption that the electric wire bundle 10 assumes a perfect circle in a sectional view (see FIG. 2).

The exterior member 20 is a corrugated tube that has a continuous, hollow-cylinder-shaped bellows structure. The bellows structure can bend partially when external force acts on the exterior member 20 that houses the electric wire bundle 10 inside. As shown in FIGS. 1(A)-1(C), the exterior member 20 changes its shape in a horizontal direction following the position of the slide door that is moved relative to the vehicle body, because certain portions (which correspond to bending portions) of the bellows structure are bent.

The sectional shape of the exterior member 20 will be described later in detail. Although the embodiment is of the case that the corrugated tube is employed as one form of the exterior member 20, in the invention the exterior member is not limited to a corrugated tube. Any kind of exterior member can be employed as long as it is bendable in a state that a bundle of electric wires is housed therein. For example, the exterior member includes a "Corru" tube that is formed in such a manner that hollow-cylinder-shaped bellows portions and hollow-cylinder-shaped portions are arranged alternately and continuously.

The vehicle-body-side power supply tool 30 is configured so as to include an outer member 31 which is made of a synthetic resin and secured to the vehicle body and an inner member 32 which is supported pivotally by the outer member 31 so as to be rotatable (swingable) in a horizontal plane and holds (supports) one end portion of the exterior member 20. The one end portion of the exterior member 20 is secured to the vehicle body via the outer member 31 and the inner member 32. The inner member 32 is supported pivotally by the outer member 31, whereby the direction to which the one end portion of the exterior member 20 is bent when the slide door is moved relative to the vehicle body is restricted in a horizontal direction.

The slide-door-side power supply tool 40 is configured so as to include an outer member 41 which is secured to an inner panel of the slide door and an inner member 12 which is supported pivotally by the outer member 41 so as to be rotatable (swingable) in a horizontal plane and holds (supports) the other end portion of the exterior member 20. The other end portion of the exterior member 20 is secured to the slide door via the outer member 41 and the inner member 42. The inner member 42 is supported pivotally by the outer member 41, whereby the direction to which the other end portion of the exterior member 20 is bent when the slide door is moved relative to the vehicle body is restricted in a horizontal direction.

Next, the shape of the exterior member 20 will be described in more detail. The exterior member 20 has a continuous, hollow-cylinder-shaped bellows structure and has an elliptical shape (see FIG. 2) in a cross section taken at any position. The term "elliptical shape" as used herein means a shape having two parallel, confronting sides and two arcs that link ends of the two sides. As shown in FIG. 2, in a sectional view, the exterior member 20 has two parallel, confronting sides L1 and L2 and two arcs A1 and A2 that link the ends of the two sides L1 and L2. A designing method for setting cross-sectional dimensions of the exterior member 20 will be described below. Although in the embodiment the arcs A1 and A2 are semicircles (180°), in the invention the arcs may have any angle between 0° and 180°.

The cross-sectional dimensions concerned of the exterior member 20 are the following two dimensions. One is the interval Ds between the inside edges of the two sides L1 and L2, and the other is the interval Dl between the deepest points of the inside edges of the two arcs A1 and A2. In the following description, the intervals Ds and Dl will be referred to as a shorter-axis length and a longer-axis length, respectively. The cross-sectional area Se, defined by the inner surfaces, of the exterior member 20 is calculated according to the following Equation (1) using the shorter-axis length Ds and the longer-axis length Dl:

$$Se = (Ds/2) \times (Ds/2) \times \pi + Ds \times (Dl - Ds) \quad (1)$$

It is assumed that the electric wire bundle 10 assumes a perfect circle having a diameter φw in a sectional view. With this assumption, the cross-sectional area Sw of the electric wire bundle 10 is calculated according to the following Equation (2):

$$Sw = (\phi w/2) \times (\phi w/2) \times \pi \qquad (2)$$

In setting the shorter-axis length Ds, to house the electric wire bundle 10 in the internal space of the exterior member 20, the following Inequality (3) should be satisfied:

$$Ds > \phi w \qquad (3)$$

The exterior member 20 is designed so that clearances C1 and C2 are formed between the electric wire bundle 10 and the two sides L1 and L2. If the clearances C1 and C2 are set too long, the load of work of housing the electric wire bundle 10 in the exterior member 20 is made lighter. The clearances C1 and C2 in the shorter axis length direction are determined according to the diameter of the electric wire bundle 10. A relationship between the diameter φw of the electric wire bundle 10, the shorter-axis length Ds, and the clearances C1 and C2 is given by the following Equation (4):

$$Ds = \phi w + C1 + C2 \qquad (4)$$

Figure 3:
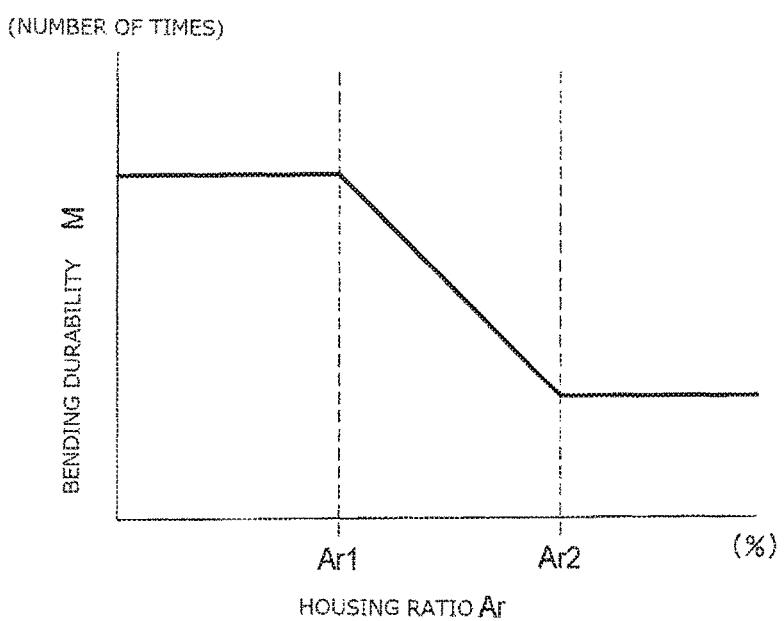
FIG. 3 is a graph showing a relationship between the housing ratio Ar and the bending durability M that is required for an exterior member.
Figure 4:
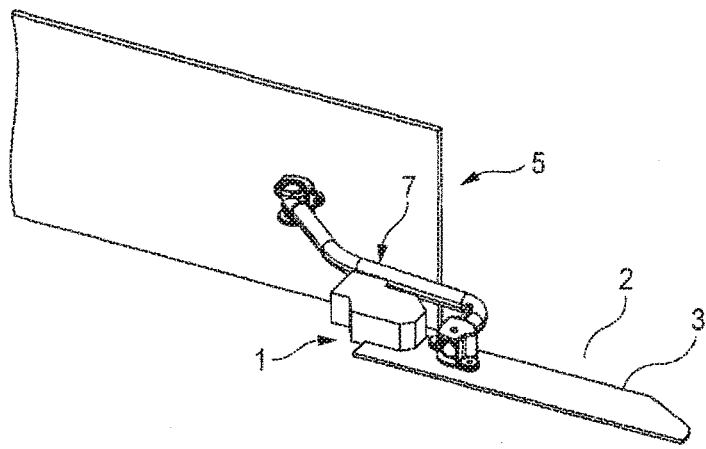
FIGS. 4(A)-4(C) are perspective views of a wire harness that is routed in the vicinity of the doorway of a slide door, and show a state that the slide door is fully opened, a state that the slide door is opened halfway, and a state that the slide door is fully closed, respectively.
Figure 4:
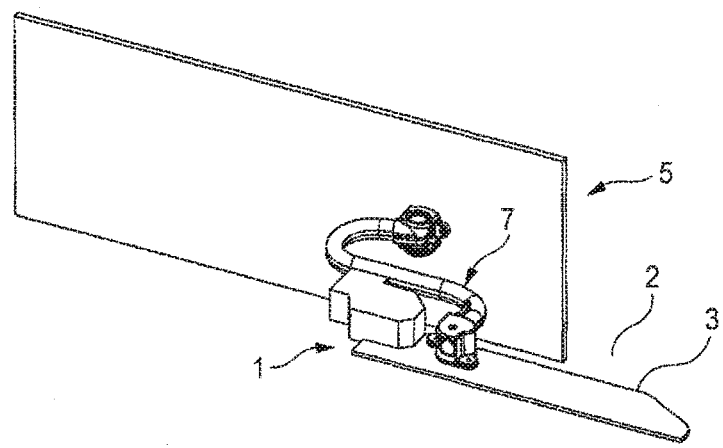
Figure 4:
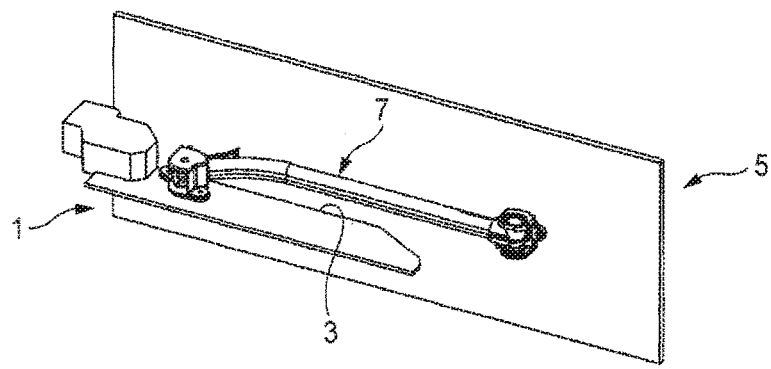

Incidentally, as shown in FIGS. 1(A)-1(C), the wire harness according to the embodiment of the invention is routed in the vehicle so that the arrangement direction of the two arcs A1 and A2 is substantially perpendicular to the direction (horizontal direction) in which the exterior member 20 is bent. As a result, compressive stress or tensile stress acts on the two sides L1 and L2 more easily and hence the exterior member 20 is bent more easily with the two sides L1 and L2 serving as axes. To make the exterior member 20 bend more easily in a horizontal direction, it is preferable that the shorter-axis length Ds be as short as possible. On the other hand, the ratio Ar of the cross-sectional area Sw of the electric wire bundle 10 to the cross-sectional area Se defined by the inner surfaces of the exterior member 20 increases as the shorter-axis length Ds decreases. In the following description, the ratio Ar will be referred to as a "housing ratio Ar." In general, the housing ratio Ar and the bending durability M that is required for the exterior member 20 have a relationship shown in a graph of FIG. 3. The bending durability M is a limit of the number of times of bending that is permitted for the purpose of maintaining necessary performance of the wire harness. As shown in FIG. 3, the bending durability M is constant when the housing ratio Ar is smaller than a certain value Ar1. The bending durability M decreases as the housing ratio Ar increases from the certain value Ar1. In a housing ratio Ar range that is larger than a certain value Ar2, the bending durability M is kept the same as a value corresponding to the housing ratio value Ar2.

Many wire harnesses routed in vehicles have housing ratios Ar that are approximately in a range of 55% to 85%, which is included in the housing ratio Ar range of from Ar1 to Ar2 shown in FIG. 3. Wire harness specifications that car makers require supplies to satisfy include an item that relates to the bending durability M. A housing ratio Ar that should be satisfied by the exterior member 20 is determined uniquely by referring to such a specification item and the relationship shown in FIG. 3. The relationship between the housing ratio Ar and the combination of the cross-sectional area Se of the exterior member 20 and the cross-sectional area Sw of the electric wire bundle 10 is given by the following Equation (5):

$$Ar = Sw/Se \qquad (5)$$

Referring to Equations (1), (2), and (5), the longer-axis length Dl is calculated according to the following Equation (6):

$$\begin{aligned} Dl &= (Se - \pi Ds^2/4)/Ds + Ds \qquad (6) \\ &= (Sw/Ar - \pi Ds^2/4)/Ds + Ds \\ &= (\pi \phi w^2/4/Ar - \pi Ds^2/4)/Ds + Ds \\ &= (\pi/4)(\phi w^2/Ar - Ds^2)/Ds + Ds \end{aligned}$$

In the above-described manner, the longer-axis length Dl can be calculated if the cross-sectional area of the electric wire bundle 10 (that is, the diameter of the electric wire bundle 10), the housing ratio Ar, and the shorter-axis length Ds. The exterior member 20 whose sectional shape is determined by the shorter-axis length Ds calculated according to Equation (4) and the longer-axis length Dl calculated according to Equation (6) is such that a necessary internal space is secured and the external shape is reduced in size. More specifically, an internal space that is necessary for housing of the electric wire bundle 10 in the exterior member 20 is secured using the shorter-axis length Ds calculated according to Equation (4). And the external shape is reduced in size while a desired housing ratio value is obtained, using the longer-axis length Dl calculated according to Equation (6).

As described above, according to the exterior member 20 of the invention, since the external shape is reduced in size, the exterior member 20 which is routed in the vicinity of the doorway of the slide door is made less visible to a driver or passenger. According to the exterior member 20 of the invention, since an internal space having a necessary volume is secured, the load of work of housing the electric wire bundle 10 in the exterior member 20 can be minimized. Furthermore, according to the exterior member 20 of the invention, since an internal space having a desired housing ratio is secured, the exterior member 20 can be given a necessary level of bending durability.

In the above-described embodiment, the wire harness including the exterior member 20 is routed in the vicinity the doorway of the slide door. However, the routing location of a wire harness having the exterior member according to the invention is not limited to the doorway of a slide door and may be any location where a wire harness is required to bend.

In the above-described embodiment, it is assumed that the cross section of the electric wire bundle 10 is a perfect circle. However, an actual bundle of electric wires consists of plural electric wires and gaps exist between them. Therefore, the cross-section of a bundle of electric wires that is assumed to be a perfect circle is larger than that of an actual bundle of electric wires. Taking this fact into consideration, it can be said that the longer-axis length Dl that is calculated in designing according to Equation (6) with the assumption that the cross-section of the electric wire bundle 10 is a perfect circle is somewhat greater than a proper value. An exterior member 20 that is more reduced in size can be designed by calculating a cross-sectional area of the electric wire bundle 10 as one that is more suitable for the cross section of an actual bundle of electric wires.

In the embodiment, since it is assumed that the cross section of the electric wire bundle 10 is a perfect circle, designing is done with the longer-axis length Dl set somewhat greater than a value that is obtained when the cross sectional area of an actual electric wire bundle is used. However, it is added that even if the shape of the exterior member 20 is determined by this designing method, its external shape is still reduced and a necessary internal space is still secured.

Now, the features of the above-described exterior member and wire harness according to the embodiment of the invention will be summarized below concisely in the form of items (1)-(3):

(1) A hollow-cylinder-shaped exterior member (20) to house an electric wire bundle (10) that is a bundle of plural electric wires, wherein:
the exterior member has a bending portion that is bendable in a state that the electric wire bundle is housed therein; and
the bending portion has an elliptical sectional shape having two parallel, confronting sides (L1, L2) and two arcs (A1, A2) that link ends of the two sides, and the interval Ds between inside edges of the two sides and the interval Dl between deepest points of inside edges of the two arcs satisfy relationships:

$$Ds = \phi w + C1 + C2$$

where $\phi w$ is a diameter of the electric wire bundle housed in the bending portion and C1 and C2 are clearances between the electric wire bundle and the two respective sides, and $$Dl = (Sw/Ar - \pi Ds^2/4)/Ds + Ds$$

where Sw is a cross-sectional area of the electric wire bundle housed in the bending portion and Ar is a ratio of the cross-sectional area Sw of the electric wire bundle to a cross-sectional area that is defined by inner surfaces of the bending portion, the ratio being determined according to bending durability that is required for the bending portion.

(2) A wire harness having the exterior member according to item (1), wherein:
the wire harness is routed in a vehicle in such a manner that an arrangement direction of the two arcs is substantially perpendicular to a direction in which the bending portion is bent.

(3) The wire harness according to item (2), wherein one end portion and the other end portion of the wire harness are secured to a vehicle body and a slide door, respectively.

Although the invention has been described in detail by referring to the particular embodiment, it is apparent to those skilled in the art that various changes and modifications are possible without departing from the spirit and scope of the invention.

The invention provides an advantage that external shape miniaturization and securing of a necessary internal space which are in a tradeoff relationship can both be satisfied. Providing this advantage, the invention is useful when applied to exterior members and wire harnesses having those exterior members.

What is claimed is:

1. A hollow-cylinder-shaped exterior member to house an electric wire bundle that is a bundle of plural electric wires, wherein: the exterior member has a bending portion that is bendable in a state that the electric wire bundle is housed therein; and the bending portion has an elliptical sectional shape having two parallel confronting sides and two arcs that link ends of the two parallel confronting sides, and an interval Ds between inside edges of the two parallel confronting sides and an interval Dl between deepest points of inside edges of the two arcs satisfy relationships:

$$Ds = \phi_w + C1 + C2$$

where $\phi_w$ is a diameter of the electric wire bundle housed in the bending portion and C1 and C2 are clearances between the electric wire bundle and the two parallel confonting sides, and $$D_l = (Sw/Ar - \pi D_s^2/4)/Ds + Ds$$

where Sw is a cross-sectional area of the electric wire bundle housed in the bending portion and Ar is a ratio of the cross-sectional area Sw of the electric wire bundle to a cross-sectional area Se that is defined by inner surfaces of the bending portion, the ratio being determined according to bending durability M that is required for the bending portion.

2. A wire harness comprising the exterior member according to claim 1, wherein: the wire harness is routed in a vehicle in such a manner that an arrangement direction of the two arcs is substantially perpendicular to a direction in which the bending portion is bent.

3. The wire harness according to claim 2, wherein one end portion and another end portion of the wire harness are secured to a vehicle body and a slide door, respectively.

* * * * *